(12) United States Patent
Cousineau et al.

(10) Patent No.: US 8,779,286 B2
(45) Date of Patent: Jul. 15, 2014

(54) NON-METALLIC ELECTRICAL BOX AND METHOD OF PRODUCTION

(75) Inventors: Richard M. Cousineau, Brooklin (CA); Jason W. Crossman, Oshawa (CA); Cerefino A. Reyes, Scarborough (CA)

(73) Assignee: Hubbell Incorporated, Shelton, CT (US)

( * ) Notice: Subject to any disclaimer, the term of this patent is extended or adjusted under 35 U.S.C. 154(b) by 62 days.

(21) Appl. No.: 13/559,139

(22) Filed: Jul. 26, 2012

(65) Prior Publication Data
US 2014/0027142 A1    Jan. 30, 2014

(51) Int. Cl.
*H02G 3/08* (2006.01)

(52) U.S. Cl.
USPC ......... 174/51; 174/6; 174/7; 361/117; 439/98

(58) Field of Classification Search
USPC .................. 174/51, 6, 7; 361/117; 439/98
See application file for complete search history.

(56) References Cited

U.S. PATENT DOCUMENTS

| | | | |
|---|---|---|---|
| 2,757,817 A | 8/1956 | Egan | |
| 2,802,972 A | 8/1957 | Warrington | |
| 3,210,458 A | 10/1965 | Palmer | |
| 4,233,641 A * | 11/1980 | Baumbach | 361/119 |
| 4,872,081 A | 10/1989 | Murphy et al. | |
| 4,960,964 A * | 10/1990 | Schnell et al. | 174/51 |
| 5,527,991 A | 6/1996 | Sadowski et al. | |
| 6,369,323 B1 * | 4/2002 | Wright | 174/51 |
| 6,403,880 B1 * | 6/2002 | Elford et al. | 174/51 |
| 6,498,295 B1 | 12/2002 | Akiyama et al. | |
| 7,041,902 B1 | 5/2006 | Savicki, Jr. et al. | |
| 7,307,214 B1 | 12/2007 | Gretz | |
| 7,351,910 B1 | 4/2008 | Magisano et al. | |
| 7,476,807 B1 | 1/2009 | Gretz | |
| 7,497,582 B1 | 3/2009 | Savicki, Jr. | |
| 7,501,575 B2 | 3/2009 | Jolly | |
| 7,510,429 B1 | 3/2009 | Savicki, Jr. et al. | |
| 7,554,032 B2 | 6/2009 | Herth | |
| 2007/0235205 A9 | 10/2007 | Lindenstraus et al. | |
| 2009/0272558 A1 | 11/2009 | Compagnone, Jr. | |

FOREIGN PATENT DOCUMENTS

CA          2 312 645          1/2001

\* cited by examiner

*Primary Examiner* — Dhirubhai R Patel
(74) *Attorney, Agent, or Firm* — Garrett V. Davis; Mark S. Bicks; Alfred N. Goodman (57) ABSTRACT

A one piece integrally formed non-metallic electrical box assembly is produced by molding an electrical box onto a metallic ground strap so that the ground strap is fixed to the electrical box. The electrical box is molded with retaining members surrounding selected portions of the metallic ground strap so that the electrical box can be molded onto the metallic ground strap without buckling or deforming the electrical box and the ground strap during the molding process by compensating for the differences in expansion between the non-metallic electrical box and the metallic ground strap.

30 Claims, 8 Drawing Sheets

NON-METALLIC ELECTRICAL BOX AND METHOD OF PRODUCTION

FIELD OF THE INVENTION

The present invention is directed to a method of molding a one-piece non-metallic electrical box and to the resulting non-metallic electrical box. The invention is further directed to a non-metallic electrical box having a metallic ground strap coupled to the electrical box and to a method for forming the electrical box.

BACKGROUND OF THE INVENTION

Electrical boxes have been produced for many years in a variety of shapes and dimensions to accommodate various electrical devices such as switches, connectors and receptacles. The electrical boxes require a suitable mounting member for coupling the electrical device to the box. Metal electrical boxes have a tab or flange with a threaded hole for receiving mounting screws for mounting the electrical device directly to the box.

Electrical boxes are commonly made of metal that can be stamped as a one-piece unit or formed from different components that can be ganged and assembled to the desired dimensions. Metal electrical boxes can be grounded directly to a ground wire. The electrical device can also be grounded directly to the electrical box.

Electrical boxes are also made of plastic. Plastic electrical boxes are desirable from the standpoint of being inexpensive, lightweight and easy to manufacture. Plastic and other non-metallic materials used for making non-metallic electrical boxes cannot be grounded directly and require a suitable ground connection for the electrical device. Electrical codes require the electrical device to be grounded. A separate grounding member or ground wire is usually required to ground the electrical device properly.

Non-metallic electrical boxes are known to have metal ground members attached to the box for providing a ground connection to the electrical device. Many of these non-metallic electrical boxes have metal components attached to the box for mounting the electrical device.

One example of a ground strap in a non-metallic electrical box is disclosed in U.S. Pat. No. 4,315,100 to Haslbeck et al. This device includes a non-metallic electrical box with a metal ground strap attached to the top end of the electrical box. The ground strap has an opening for receiving a threaded fastener for coupling directly to the electrical box. A second threaded opening is provided at the opposite end of the ground strap for receiving a fastener for coupling directly to a ground wire. The ground strap is attached to the electrical box after the electrical box is formed.

Another example is disclosed in U.S. Pat. No. 3,210,458 to Palmer. This device includes a metallic strap attached to the side wall of the electrical box. The ground strap has a top portion with a threaded hole for receiving a mounting screw of an electrical device. The end of the top portion has a downwardly extending anchoring lug in a hole in the box to attach the ground strap to the box. The bottom portion of the ground strap has a tab that extends through a hole in the bottom wall of the electrical box. The tab is bent to attach the ground strap to the bottom of the electrical box.

Another example of a non-metallic electrical box with a ground strap is disclosed in U.S. Pat. No. 6,369,323 to Wright. This electrical box includes a metallic ground strap supported within the box by screws that extend into the bottom wall of the box. The ground strap has an L-shape with a top portion for supporting the electrical device. A top end has a downwardly extending hook-shaped member received in a hole formed in a top edge of the box.

Examples of other non-metallic electrical boxes having metal grounding components are disclosed in U.S. Pat. No. 4,960,964 to Schnell et al. and U.S. Pat. No. 6,403,880 to Elford et al. The '880 patent discloses a metal ground strap that is attached to the inner surface of the electrical box by a friction fit with inner struts molded within the box. The ground strap is assembled by positioning the ground strap into the cavity of the previously molded electrical box. The ground strap is held in place by forcing the ground strap into the box between the struts. The '964 patent discloses a grounding assembly for a non-metallic electrical box having a metallic grounding plate and a conducting clip. The grounding plate has a central portion with a downward extending coupling flange that frictionally engages a slot formed in a molded lug.

The prior non-metallic electrical boxes have metallic ground members that are assembled with the preformed molded box. The ground members require fasteners to couple the ground member to the box and an additional assembly step.

While the prior electrical boxes have been suitable for their intended use, there is a continuing need in the industry for improved non-metallic electrical boxes and methods of producing non-metallic electrical boxes.

SUMMARY OF THE INVENTION

The present invention is directed to a non-metallic electrical box and to a method for producing the non-metallic electrical box. The invention is particularly directed to a non-metallic electrical box having a metallic ground strap formed therein and to the method of molding the electrical box.

An object of the invention is to provide a non-metallic electrical box having a metallic ground member formed with the electrical box to provide mounting and grounding of the electrical device. One feature of the invention is to provide a non-metallic electrical box where a ground member is fixed permanently to the box during the molding of the box.

The electrical box of the invention is a one-piece member and is formed in a single molding step. The non-metallic electrical box is molded from a suitable plastic material in contact with a metallic member so that the ground member is fixed to the box.

Another aspect of the invention is to provide a non-metallic electrical box having a metallic ground member where the metallic ground member is at least partially encased by the molded plastic material. The metallic ground member is encased by the molded plastic at selected locations that allow expansion and contraction of the metallic ground strap and the plastic box during the molding process to prevent distortion of the plastic box.

The non-metallic electrical box is formed as a one-piece, unitary member by a suitable molding step, such as by injection molding. A metallic material ground member is supported within the mold so that the molding material is molded over the metallic ground member. The molding material is molded onto the metallic ground member so that a substantial portion of the surface area of the metallic ground member is exposed in the finished electrical box with minor portions being enveloped by the molding material to couple the metallic ground member and the molded box together.

The non-metallic electrical box has a fixed metallic ground member where the ground member and the non-metallic electrical box are constructed in a manner to accommodate for the differences in the thermal expansion coefficients between the metal ground strap and the plastic box. The electrical box is constructed so that the electrical box and the ground member do not exhibit deformation, twisting or buckling during manufacture as a result of heating and cooling of the materials that can result in different expansion and contraction of the materials.

Another feature of the invention is to provide a non-metallic electrical box having a metal ground member coupled to the molded box at locations on the ground member to allow thermal expansion and contraction of the metallic ground member with respect to the non-metallic electrical box during manufacture of the plastic box.

A further feature of the invention is to provide a non-metallic electrical box having a metallic ground strap with a bottom section on the bottom wall of the box and a first leg on a side wall where at least a portion of the leg and the bottom section are exposed to provide a ground connection with an electrical device. The bottom section has a pair of ground screws aligned with access openings in the sides of the box.

Another feature of the invention is to provide a non-metallic electrical box with a metallic ground strap on the bottom wall of the electrical box. The electrical box is made by molding a plastic material in a mold cavity where the metallic ground strap is positioned within the mold. The plastic material is molded to form the box on the metallic ground strap where a portion of the plastic material is molded around or over a portion of the metallic ground strap.

The non-metallic electrical box in one embodiment has a metallic ground strap with a bottom section where the bottom of the box is molded over at least one portion of the bottom section to couple the ground strap to the inner surface of the electrical box. The ground strap has two vertical legs extending upwards from the opposite ends of the bottom section and extend along opposite side walls or lugs formed on the side walls. The ground strap can be coupled to the box by molding a retaining portion of the plastic material over a portion of the bottom section at a location spaced from the ends so that portions of the bottom section are exposed on opposite sides of the retaining portion. The ends of the first wall and the bottom ends of the vertical legs can also have an overmold portion forming retaining members. The retaining members are molded during the molding of the electrical box to encase portions of the ground strap to fix the ground strap to the box without the need for a separate assembly step and without fasteners.

Another feature of the invention is to provide a non-metallic electrical box having a substantially U-shaped metallic ground strap extending along a bottom wall and opposite end walls. The ground strap has upwardly extending legs with a top portion having a downwardly turned anchoring tab that is embedded within the molded electrical box.

The electrical box is made by a molding process where a molding material is injection molded into a mold cavity. A metallic ground strap is positioned within the mold cavity and the plastic molding material is introduced to the mold cavity to mold the electrical box onto and around portions of the ground strap.

The various features of the invention are basically attained by providing an electrical box assembly comprising a one piece, unitary, molded non-metallic electrical box having a bottom wall, a side wall forming a cavity and an open top end. A metallic ground strap is provided with a bottom section on the bottom wall and a first leg on the side wall and extending perpendicular from a first end of the bottom section. The bottom wall of the electrical box has a first molded retaining member overlying a top surface of the ground strap to fix the ground strap to the electrical box where the retaining member is integrally formed with the electrical box.

The various features of the invention are further attained by providing an electrical box assembly comprising a one piece, unitary, non-metallic electrical box having a bottom wall, a side wall and an open top end opposite the bottom wall. A metallic ground strap is provided with a bottom section coupled to the bottom wall by a first retaining member integrally formed with the bottom wall and surrounding a portion of the bottom section of the ground strap. A first leg extends from a first end of the bottom section and has a hook-shaped top end coupled to a top edge of the side wall, and a second leg extending from a second end of the bottom section of the ground strap and has a hook-shaped top end coupled to the top edge of the side wall opposite the first leg.

The various features of the invention are also attained by providing a process of producing a non-metallic plastic electrical box having a metallic ground strap where the electrical box is molded around at least one portion of the metallic ground strap to capture the ground strap. The process comprises positioning the metallic ground strap in a mold cavity and introducing the molding material into the mold cavity to form the electrical box directly onto the metallic ground strap. The metallic ground strap has a bottom section, a first leg extending perpendicular from a first end of the bottom section, and a second leg extending substantially perpendicular from a second end of the bottom section. Each of the first and second legs have a distal end with a hook-shaped anchor portion. The electrical box is molded onto the metallic ground strap from a molding material where the electrical box has a molded first retaining member surrounding a portion of the metallic ground strap to fix the metallic ground strap to the electrical box and allow expansion and contraction of the metallic ground strap and the electrical box without buckling or deformation of the metallic ground strap during molding and cooling of the electrical box. The electrical box is a one-piece structure with a bottom wall, a side wall and an open top end with the metallic ground strap fixed to an inner surface of the electrical box.

The various feature of the invention are further attained by providing a process of producing a non-metallic electrical box having a bottom wall, a side wall, and open ends opposite the bottom wall and a metallic ground strap. A first mold part is provided for molding an interior cavity of the electrical box. The first mold part has a bottom face and opposite side faces. The bottom face has a recess extending along the bottom face and opposite side faces. A metallic ground strap is positioned in the recess. The ground strap has a bottom section received in the recess along the bottom face of the first mold part and first and second legs received in the recesses along the opposite side faces. The metallic ground strap further has a hook-shaped member at a distal end of each of the first and second legs. A second mold part is coupled to the first mold part to define a mold cavity therebetween. A plastic material is injected into the mold cavity and the electrical box is molded as a one-piece, unitary structure to the metallic ground strap. The first and second mold parts form a molded first retaining member overlying a portion of the bottom section of the metallic ground strap to allow expansion and contraction of the metallic ground strap and plastic electrical box without distortion of the electrical box.

These and other objects, advantages and salient features of the invention will be apparent from the following detailed description of the invention, which taken in conjunction with the annexed drawings, disclose various embodiments of the invention.

BRIEF DESCRIPTION OF THE DRAWINGS

The following is a brief description of the drawings, in which.

DETAILED DESCRIPTION OF THE INVENTION

The present invention is directed to a non-metallic electrical box having a metal ground strap and to a method of producing the non-metallic electrical box. The invention is particularly directed to a non-metallic electrical box formed as a one-piece integral structure molded around and onto the metal ground strap so that the metal ground strap is fixed to the electrical box in a single molding step. The electrical box is molded with predetermined portions surrounding portions of the ground strap in a manner to prevent or inhibit distortion or warping of the plastic electrical box and/or the metallic ground strap during the molding process due to the different expansion coefficients of the metal ground strap and the plastic electrical box.

Figure 1:
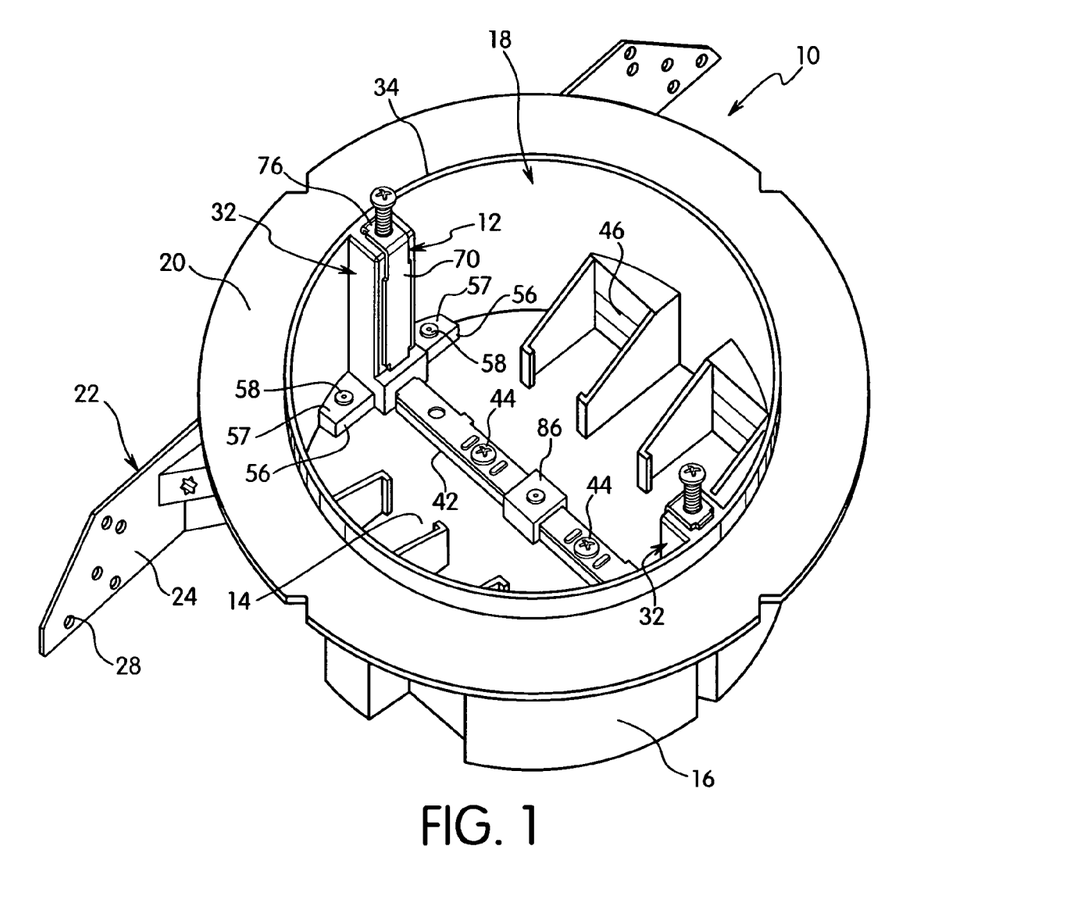
FIG. 1 is a perspective view of the electrical box showing the metallic ground strap in one embodiment of the invention.

Referring to the drawings, the invention is directed to an electrical box 10 having a metal ground strap 12 as shown in FIG. 1. The electrical box 10 is molded as a one-piece unit having a bottom wall 14, a side wall 16, and an open top end 18. In the embodiment shown, a top flange 20 extends outwardly from the side wall 16. A mounting bracket 22 is formed on one side of the electrical box for mounting the electrical box to a building stud or other support structure. In the embodiment shown, the electrical box has a substantially circular side wall integral with the bottom wall 14. In other embodiments, the electrical box can have a square or rectangular configuration. The electrical box 10 is shown as a single gang unit for supporting an electrical device such as a switch or electrical receptacle. In other embodiments, the electrical box can be a multi gang unit for supporting more than one electrical device.

Figure 5:
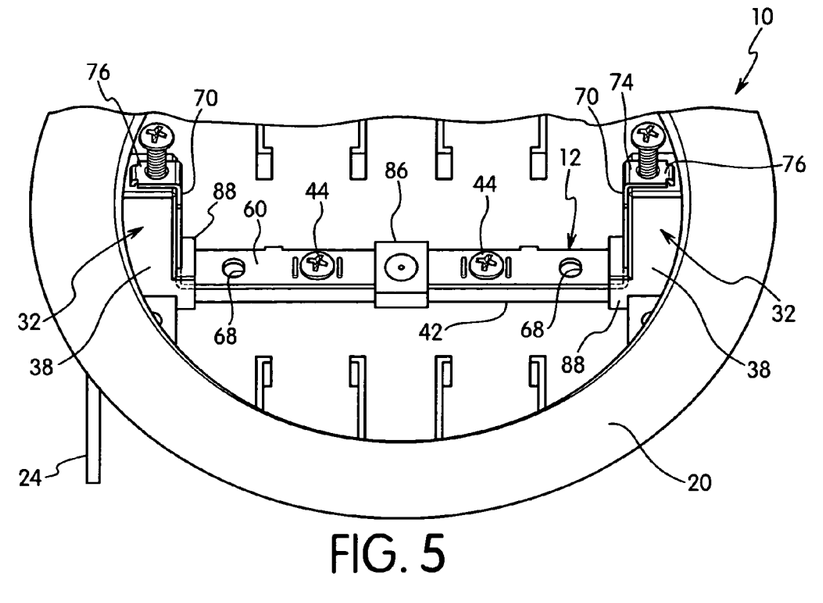
FIG. 5 is a partial top perspective view of the electrical box showing the ground strap molded into the box.
Figure 6:
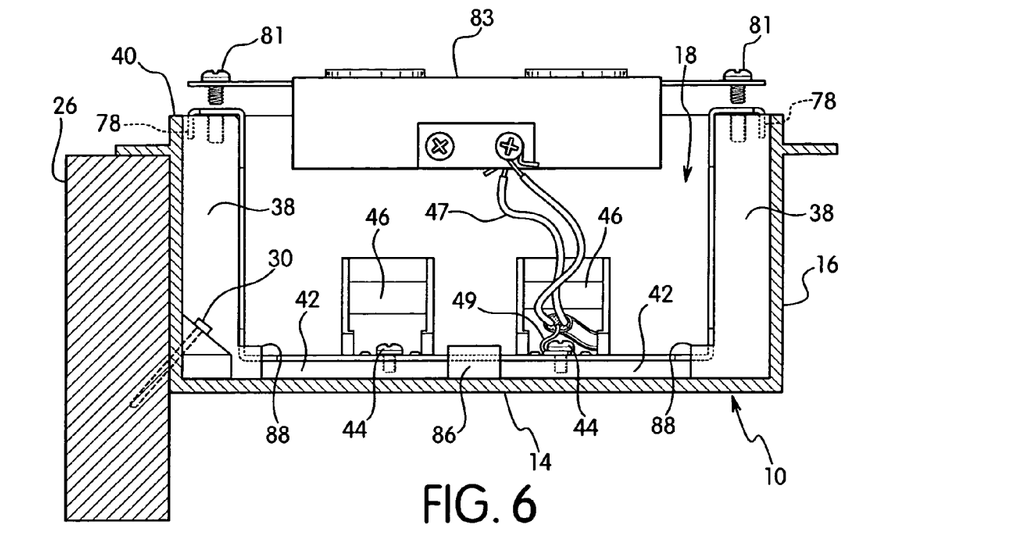
FIG. 6 is a cross-sectional side view of the electrical box showing the metallic ground strap molded to the box.
Figure 7:
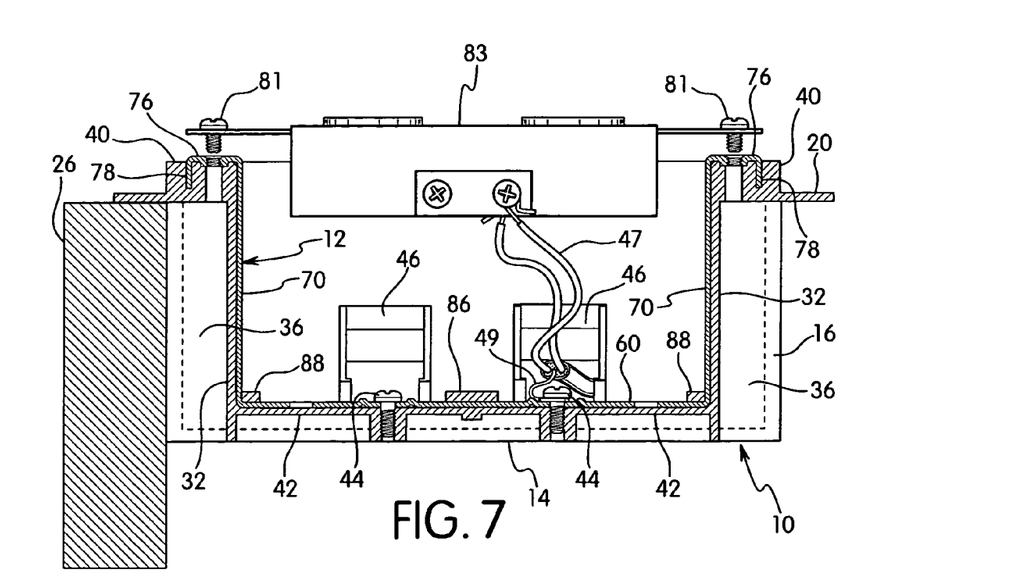
FIG. 7 is a cross-sectional side view of the electrical box showing the molded raised supports for the ground strap.
Figures 8, 9, 10:
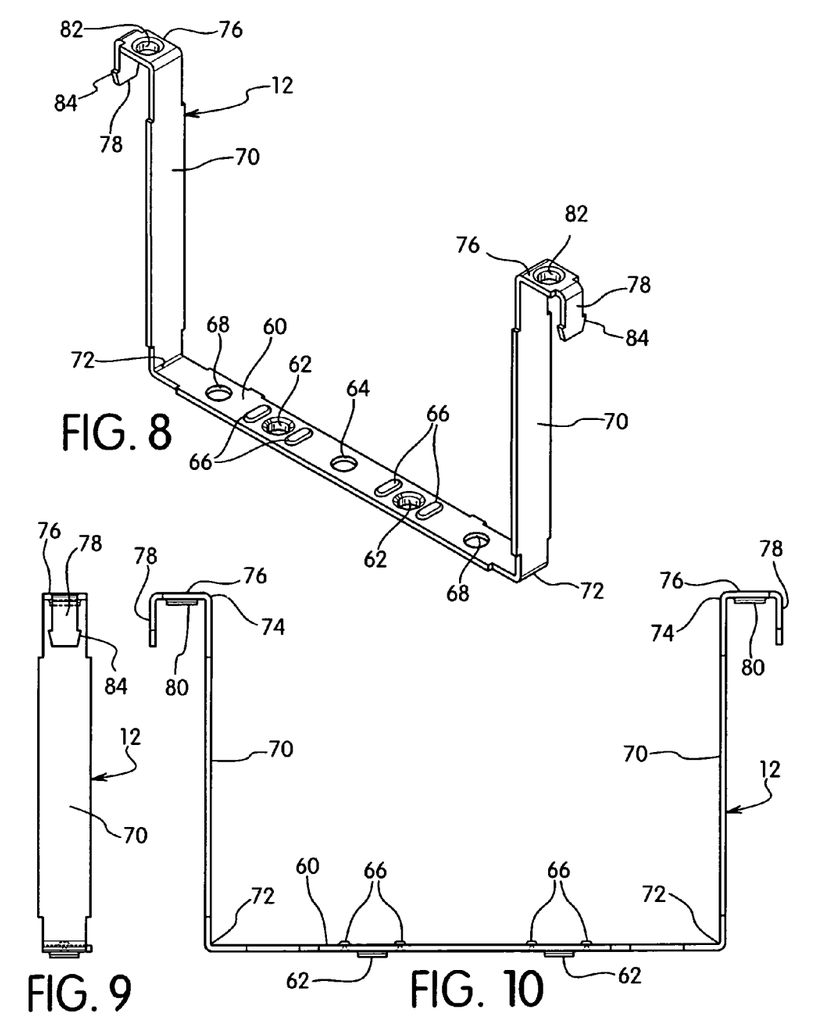
FIG. 8 is a perspective view of the ground strap in one embodiment of the invention.
FIG. 9 is an end view of the metallic ground strap.
FIG. 10 is a side view of the metallic ground strap.
Figure 11:
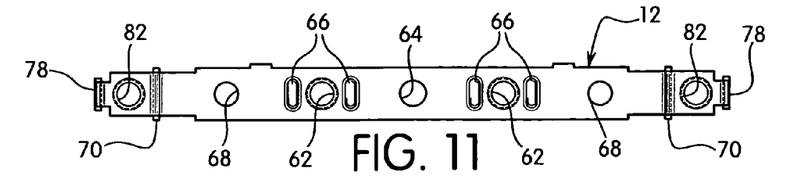
FIG. 11 is a top view of the metallic ground strap.

Referring to FIGS. 1-5, the electrical box 10 has the circular side wall 16 with the mounting bracket 22 integrally formed with the side wall and extending tangentially from the side wall. The mounting bracket 22 has a pair of mounting flanges 24 for mounting against a wall stud 26 as shown in FIGS. 6 and 7. Each mounting flange 24 has a plurality of holes 28 for receiving a fastener 30 such as a nail or screw for mounting the electrical box 10 to the wall stud 26.

Figure 2:
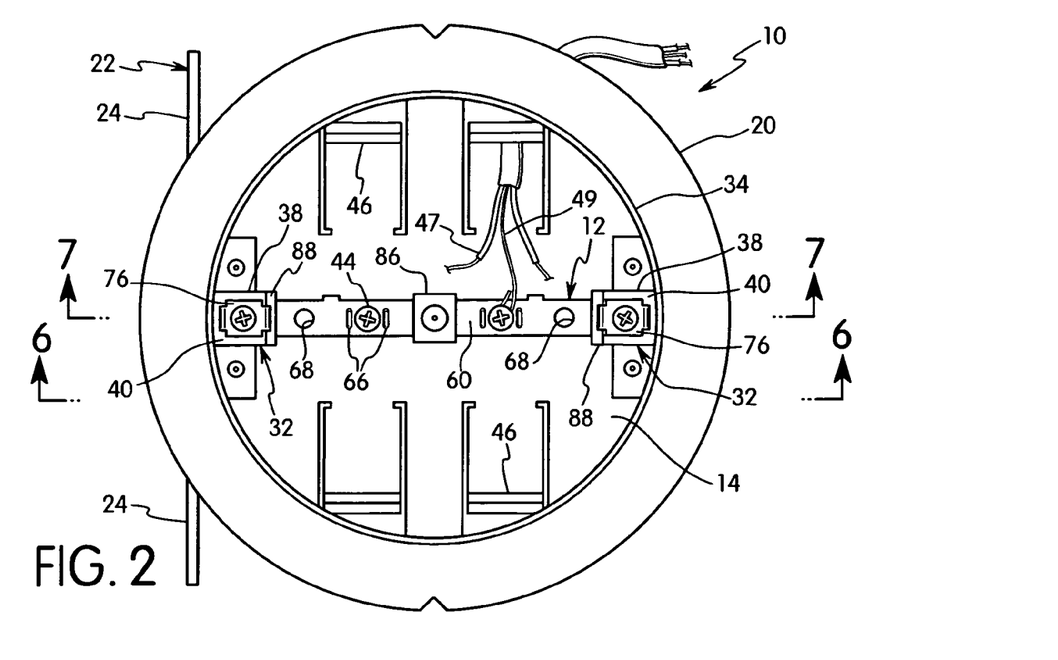
FIG. 2 is a top view of the electrical box of FIG. 1.
Figure 3:
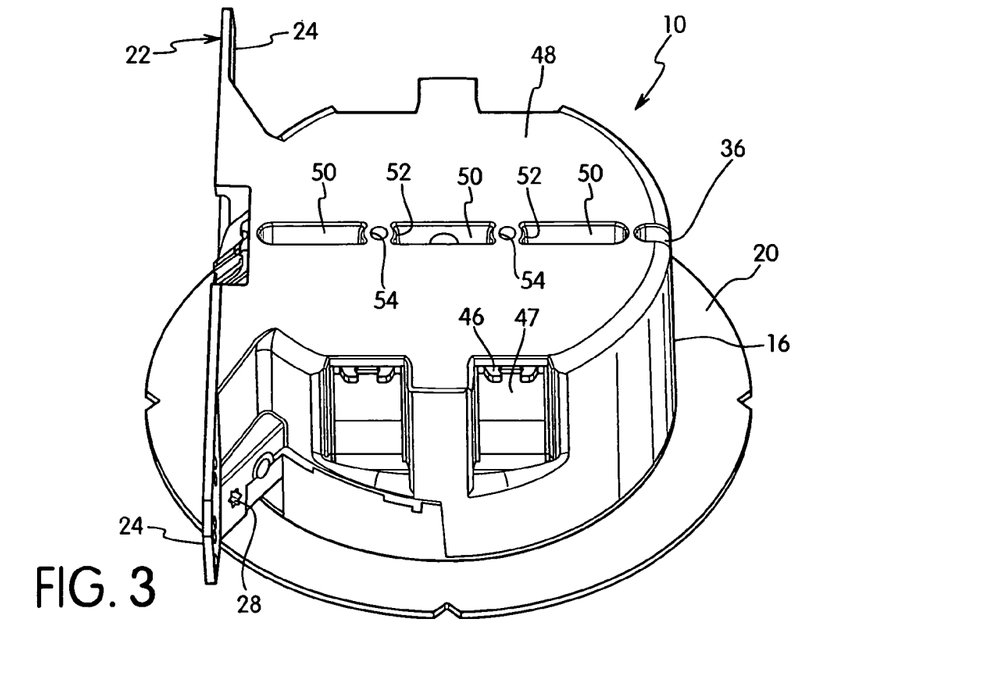
FIG. 3 is a bottom perspective view of the electrical box.
Figure 4:
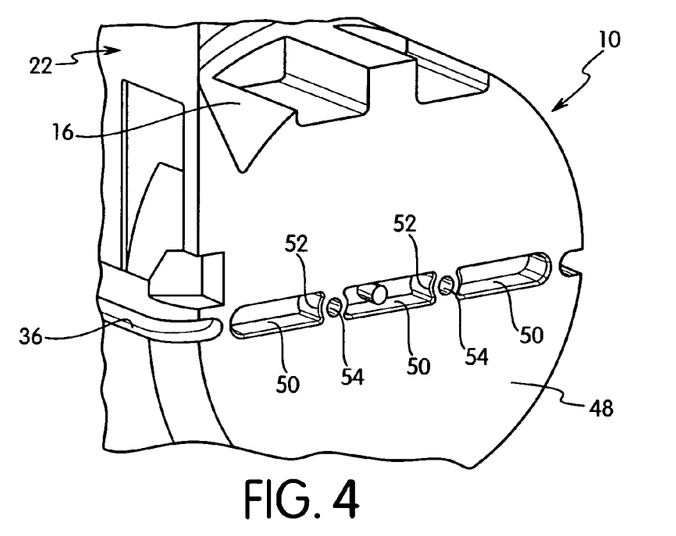
FIG. 4 is a partial bottom perspective view of the electrical box showing the bottom side and molded recesses.

The metallic ground strap 12 is mounted within the electrical box as shown in FIGS. 1 and 2. The electrical box is molded onto the metallic ground strap 12 to permanently attach the metallic ground strap to the box and prevent separation of the ground strap from the box. The electrical box 10 includes a pair of internally positioned mounting posts 32 for supporting the ground strap 12. Each post 32 extends from the bottom wall 14 to the top edge 34 of side wall 16. In the embodiment shown, each post 32 is oriented within the interior cavity of the electrical box along opposite side walls. Each post 32 is positioned on opposite ends of the electrical box as shown in FIG. 2. Each post 32 has a hollow axial passage formed by a longitudinal slot 36 formed in the outer surface of the side wall as shown in FIG. 3. In the embodiment shown, the longitudinal slot 36 extends from the bottom wall 14 to the flange 20. The post 32 has inwardly extending side surfaces 38, an inwardly facing surface for receiving the ground strap, and a top end 40 for supporting the metal ground strap 12.

Adjacent each side of the post 32 opposite the mounting bracket 22 is a pair of nailing blocks 56. The nailing blocks 56 are formed at the bottom end of the side wall 16 and the bottom wall 14 as shown in FIG. 1. An inclined face 57 is formed with nail holes 58 to receive nails or other fasteners for mounting the electrical box to a support.

The bottom wall 14 of the electrical box 10 defines a substantially flat planar surface perpendicular to the side wall 16. As shown in FIGS. 1 and 5, the bottom wall 14 is provided with a raised rib 42 forming a ledge for supporting the ground strap 12. The rib 42 extends between the posts 32 to form a continuous surface for supporting the ground strap 12 and spacing the ground strap from the bottom wall 14. The rib 42 has a width corresponding substantially to the width of the ground strap and a height extending from the bottom wall to receive the ground screws 44 extending through the ground strap 12 and into the rib 42. Preferably, the rib has a height so that a standard ground screw can be threaded into the ground strap 12 without extending past the bottom face.

The sides of the electrical box perpendicular to a longitudinal direction of the ground strap are provided with wire entry ways 46 with integral cable clamping members 47 for feeding electrical cable or wiring 47 into the electrical box. In the embodiment shown, each of the openings are aligned directly with a respective ground screw 44. The cable clamping members 47 are flexible members that can bend inwardly allowing the wire or cable to pass through and then retract to clamp the wire or cable in place. A ground wire 49 from the electrical cable 47 can be attached to the ground screw 44 to ground the ground strap 12. As shown in FIGS. 6 and 7, an electrical wiring device such as a duplex receptacle 83 is attached to the ground strap 12 by screws 81 to ground the receptacle 83 to the ground strap 12. A separate ground wire can also be extended between a ground connection on the electrical device and the ground screw 44.

As shown in FIG. 3, the rib 42 is formed by a recess 50 in the bottom face 48 of the bottom wall 14 so that the raised rib 42 has a substantially uniform thickness corresponding to the thickness of the bottom wall 14. As shown in FIG. 3, the bottom face 48 is formed with three longitudinal recesses 50 separated by mounting posts 52. Each mounting post 52 has an axial bore 54 for receiving the ground screw 44 extending downwardly through the ground strap 12. In the embodiment shown, each mounting post 52 extends from the bottom face of the bottom wall 14 to the top of the raised rib 42. The recesses 50 in the bottom wall provide the rib 42 with a substantially uniform thickness of plastic material during the molding process to provide uniform expansion and contraction due to changes in temperature during the molding process.

The ground strap 12 as shown in FIGS. 8-11 has a substantially U-shape with a bottom section 60 having a length to extend between the posts 32 along the bottom wall 14 and the longitudinal rib 42 as shown in FIGS. 6 and 7. The bottom section 60 includes two apertures 62 for receiving the ground screws 44 and a center aperture 64 for receiving the plastic material and anchoring the ground strap to the electrical box in the center portion of the ground strap during the molding process. Adjacent each side of the screw receiving aperture 62 are upwardly extending detents 66 for mating with the head of the respective ground screw 44 and the ground wire to provide a secure connection. In one embodiment, an aperture 68 is positioned outwardly from the screw holes 62 for attaching to the box during the molding process.

The ground strap 12 includes an upwardly extending leg 70 that extends from each end of the bottom section 60. Each leg 70 has a height corresponding to the height of the post 32. The upper end 74 of each leg 70 has an outwardly extending mounting flange 76 with a downwardly extending tab 78. The flange 78 is formed with a collar 80 having a threaded screw hole 82 for receiving the mounting screws 81 of the electrical device 83 as shown in FIGS. 6 and 7. The downwardly extending tab 78 includes a barb 84 for anchoring the tab in the plastic material of the electrical box.

The ground strap 12 is overmolded by the plastic material of the electrical box during the molded process of the electrical box. This eliminates the step of assembling the ground strap to the electrical box and prevents separation of the ground strap from the electrical box. The overmolding of the plastic material on the metal ground strap is carried out in a manner to resist warping and deformation of the electrical box due to the coefficient of thermal expansion of the metal ground strap relative to the plastic material of the electrical box. The location of the overmolding of the plastic material onto the metal ground strap prevents deformation and buckling of the plastic electrical box that would otherwise occur as a result of the expansion and contraction of the metal ground strap relative to the electrical box during the molding of a thermoplastic or thermosetting plastic material and the cooling of the plastic material.

Referring to FIGS. 1, 5 and 6, the ground strap 12 is coupled to the electrical box in a fixed manner that prevents separation of the ground strap from the electrical box. The ground strap is oriented within the electrical box so that the bottom section 60 is supported on the raised rib 42 and the legs 70 extend along the inner surface of the post 32. The barb 84 penetrates the plastic material of the post 32 to anchor the top end and mounting tab 78 to the electrical box.

In one embodiment, a center overmolded portion 86 is formed during the molding process of the electrical box to surround the top face of the bottom section 60. The center overmolded portion 86 is integrally formed with the bottom wall 14 and the raised rib 42 so that the plastic material surrounds a center portion of the bottom section 60 as shown in FIG. 5. The plastic material is molded to penetrate the center aperture 64 of the bottom section 60 of the ground strap 12. The molded plastic material in center aperture 64 anchors the center portion of the ground strap 12 so that expansion and contraction of the ground strap occurs in an outward direction with respect to the center aperture 64. In one embodiment, the longitudinal length of the center overmolded portion 86 is about 10-15% of the longitudinal length of the bottom section 60 of the ground strap so that a substantial portion of the ground strap is exposed.

The ends of the bottom section 60 at the apex between the bottom section 60 and the respective legs 70 are also anchored by an end overmolded portion 88. As shown in FIG. 1, the end overmolded portions 88 are integrally formed with the respective post 32 and the raised rib 42 to surround the ground strap 12. The plastic material can also be formed in the apertures 68 of the ground strap to stabilize the ground strap with respect to the electrical box. The anchoring of the ground strap by the overmolded portions 86 and 88 are located to allow anchoring of the ground strap to the electrical box 10 and allow thermal expansion and movement of the metal ground strap with respect to the electrical box during the molding and cooling process of the electrical box. As shown in FIG. 1, a substantial portion of the legs 70 are not covered by the plastic material during the molding process. The mounting flanges 76 are also not overmolded by the plastic material to expose the entire surface of the mounting flange 76. The barb 84 and the downward tab 78 are overmolded to anchor the tab 78 in the plastic material.

Figure 12:
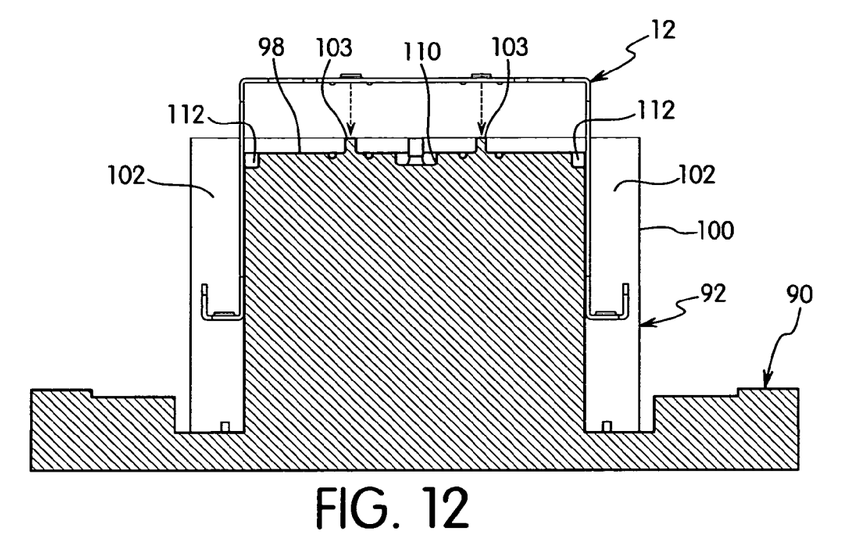
FIG. 12 is a partial cross-sectional view of the open mold for forming the electrical box of FIG. 1 showing the ground strap being positioned on the mold part.
Figure 13:
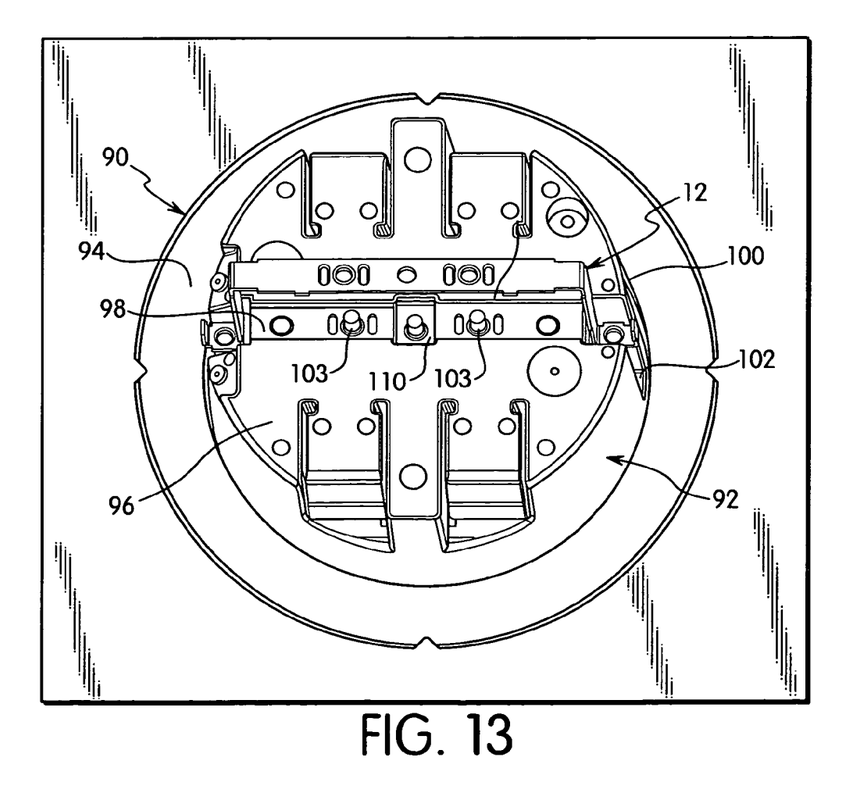
FIG. 13 is a top perspective view of the mold part of FIG. 12 showing the metallic ground strap.
Figure 14:
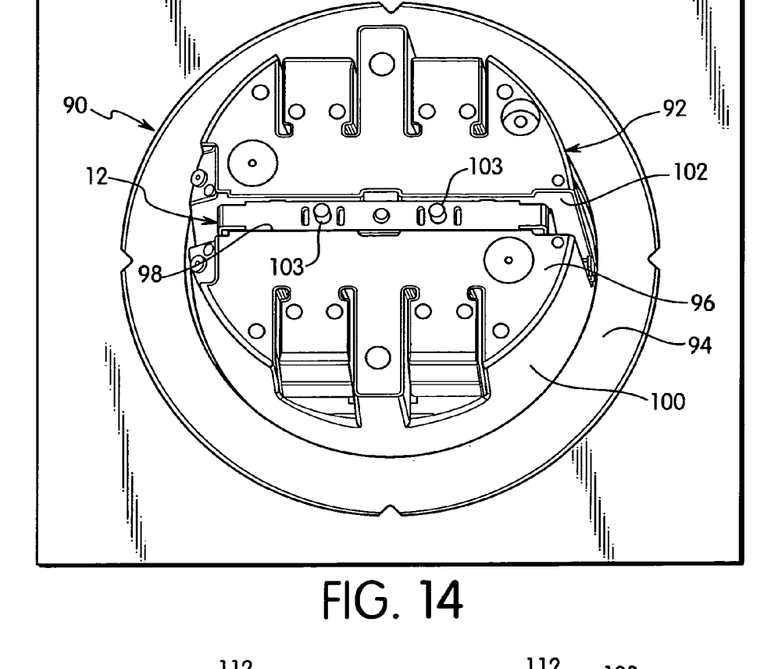
FIG. 14 is a perspective view of the mold part with the metallic ground strap attached to the mold part.

The electrical box 10 is formed by injection molding using a thermoplastic polymer or thermosetting resin such as a polyester resin as known in the art or other suitable molding material or polymers. Referring to FIGS. 12-16, the electrical box 10 is formed by a first mold part 90. The first mold part 90 has a body 92 for molding the interior of the electrical box and a recess 94 for molding the flange 20. During the molding process, the preformed metal ground strap 12 is positioned onto the first mold part 90 as shown in FIGS. 12 and 13. The body 92 of the first mold part has a top face 96 forming the bottom surface of the electrical box. The top face 96 has a longitudinal recess 98 that extends across the top face 96 and a recess 102 in the side face of the body 92. As shown in FIG. 14, the metal ground strap 12 is positioned within the longitudinal recess 98 and the recess 102 in the side 100 of the body 92. The body 98 includes projections 103 within the longitudinal recess 98 to extend through the screw aperture 62 in the metal ground strap 12 to prevent plastic material from entering the screw apertures 62 and for forming the axial bore for receiving the ground screw.

Figure 15:
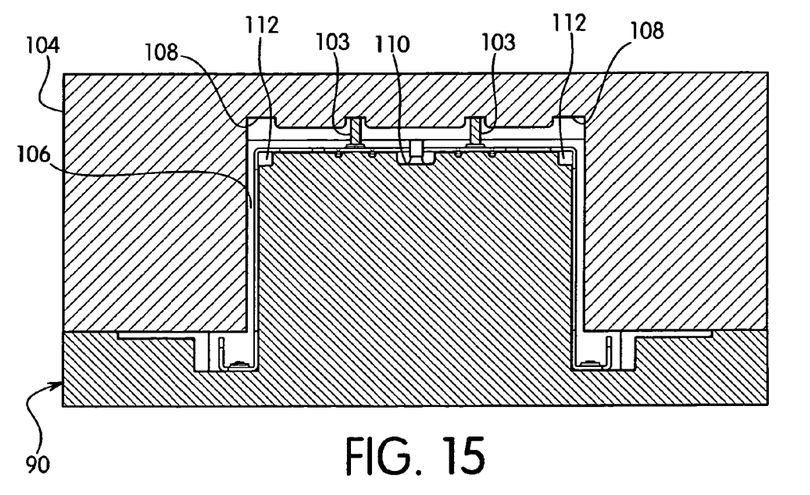
FIG. 15 is a partial cross-sectional side view of the closed mold with the metallic ground strap attached to one of the mold surfaces.
Figure 16:
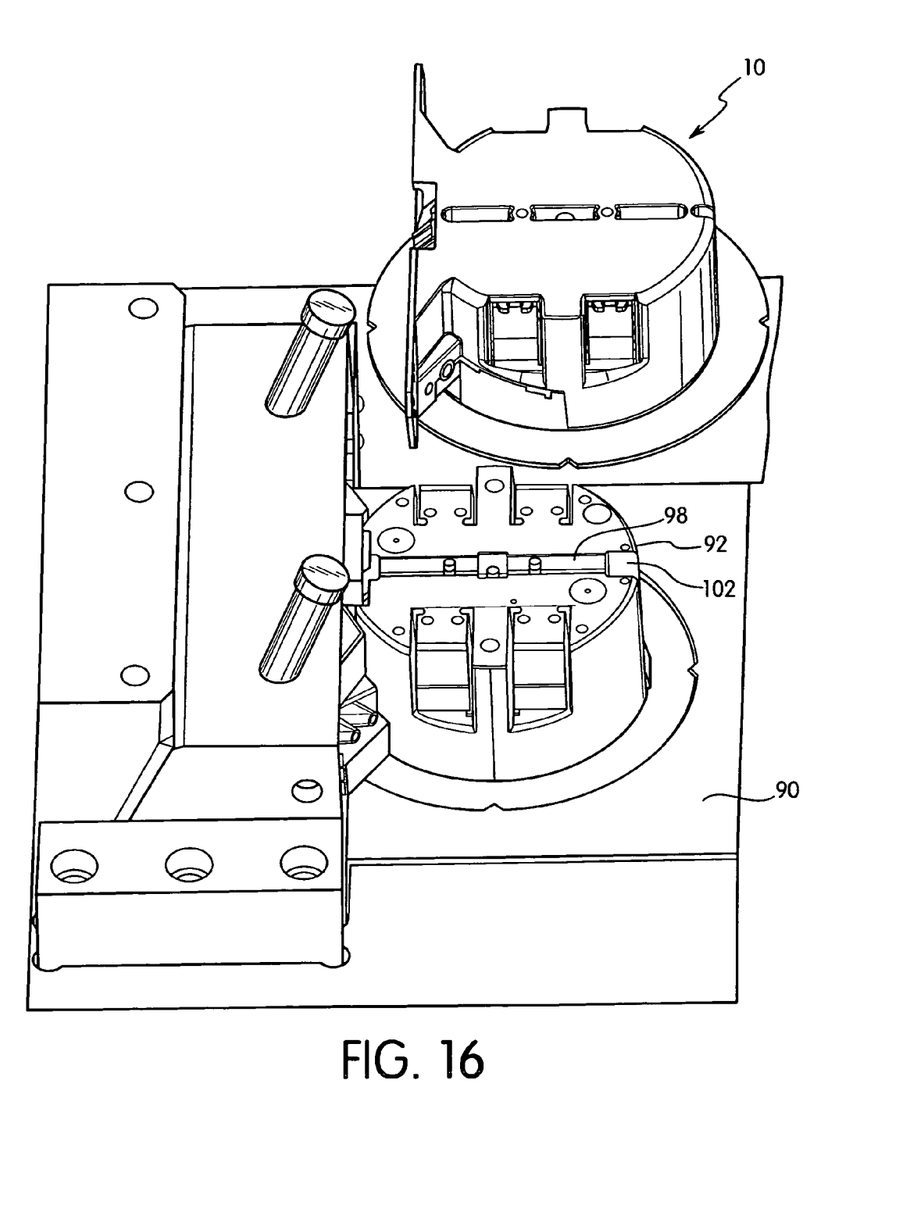
FIG. 16 is a perspective view of the mold part and the molded electrical box being separated from the mold part.

After the metal ground strap 12 is positioned on the first mold part 90, the second mold part 104 is fitted onto the first mold part to define the mold cavity 106 for forming the electrical box. As shown in FIG. 15, the second mold part 104 has a concave recessed portion 108 having a shape corresponding to the outer surface of the electrical box. The plastic material is injected into the mold cavity 106 by standard injection molding processes to fill the mold cavity with the plastic material. The top face 96 of the body 92 has a recessed portion 110 for forming the center overmold portion 86. The ends of the longitudinal recess 98 include a recessed portion 112 for forming the end overmolded portions 88. The plastic material is injected into the mold cavity 106 to fill the cavity and mold the plastic material around the barbs 84 of the mounting tabs 78 and the cavities for forming the center overmolded portion 86 and the end overmolded portions 88. The molded electrical box is then separated from the mold as shown in FIG. 16. The attachment of the metal ground strap to the molded plastic electrical box by the barbs 84 and the overmolded portions 86 and 88 allow the molded electrical box and the metal ground strap to cool without distorting or buckling of the electrical box by compensating for the difference between the coefficient of thermal expansion of the plastic material and the metal for forming the metal ground strap.

The invention is described herein as various embodiments. It will be understood by one skilled in the art that various changes and modifications can be made to the structure and process steps for forming the electrical box without departing from the spirit and scope of the invention as defined in the appended claims.

What is claimed is:

1. An electrical box assembly comprising:
a one piece, unitary, molded non-metallic electrical box having a bottom wall, a side wall forming a cavity and an open top end; and
a metallic ground strap having a bottom section on said bottom wall and a first leg on said side wall and extending perpendicular from a first end of said bottom section, said bottom wall of said electrical box having a first overmolded portion surrounding a portion of a top surface of said ground strap to fix said ground strap to said electrical box and where said overmolded portion is integrally molded with said electrical box.

2. The electrical box assembly of claim 1, wherein said first overmolded portion is integrally formed with said bottom wall and surrounds said portion of said bottom section and has a dimension to extend along a longitudinal dimension of said bottom wall a distance sufficient to allow expansion of said ground strap and prevent buckling and deformation of said electrical box and said metallic ground strap during molding of said electrical box.

3. The electrical box assembly of claim 1, wherein said electrical box further comprises a second overmolded portion spaced-apart from said first overmolded portion and surrounding a portion of said metallic ground strap at an apex between said bottom section and said first leg, said second overmolded portion being integrally formed with said electrical box.

4. The electrical box assembly of claim 3, wherein said ground strap has a second leg extending from a second end of said bottom section and extending along said side wall opposite said first leg, and
said electrical box further comprises a third overmolded portion surrounding a portion of said ground strap at an apex between said bottom section and second leg.

5. The electrical box assembly of claim 4, wherein said first leg and second leg each have a distal end with an outwardly extending mounting tab for mounting an electrical wiring device to said electrical box, and an anchoring member extending into the molded electrical box for coupling said mounting tab to said electrical box.

6. The electrical box assembly of claim 1, wherein said bottom section of said ground strap includes a first ground screw for connecting said ground strap to a ground wire, and said side wall of said electrical box has a first wireway on a first side of said ground strap and a second wireway on a second side of said ground strap, said first and second wireways being aligned with the first ground screw for feeding electrical wiring to said first ground screw.

7. The electrical box assembly of claim 6, wherein said bottom section of said ground strap has a second ground screw, said side wall of said electrical box has a third wireway for forming an opening on said first side of said ground strap, and a fourth wireway on second side of said ground strap for forming an opening, said openings being aligned with said second ground screw for feeding electrical wiring to said ground screw.

8. The electrical box assembly of claim 1, wherein said ground strap has a second leg extending from a second end of said bottom section, each of said first leg and second leg has an outwardly extending mounting flange for mounting an electrical wiring device and a downwardly extending tab extending into said side wall, said side wall being molded around said tab.

9. The electrical box assembly of claim 1, wherein said electrical box includes a molded post on an inner surface of said side wall for supporting said ground strap, and where said post includes a second overmolded portion molded around a portion of said first leg to fix said ground strap to said electrical box.

10. The electrical box assembly of claim 9, wherein said second overmolded portion surrounds said ground strap at an apex between said first leg and bottom section.

11. The electrical box of claim 1, wherein said bottom wall has a raised rib having a top surface spaced from said bottom wall, and where said bottom section of said metallic ground strap is supported on said raised rib.

12. The electrical box of claim 11, wherein said first overmolded portion is integrally formed with said raised rib.

13. The electrical box of claim 1, wherein said first overmolded portion is integrally formed with said bottom wall and side wall of said electrical box and surrounds a portion of said first leg and said bottom section of said ground strap.

14. The electrical box of claim 1, wherein said bottom section of said ground strap has a center aperture, and where said first overmolded portion penetrates said center aperture to anchor said bottom section of said ground strap to said electrical box.

15. An electrical box assembly comprising:
a one piece, unitary, non-metallic electrical box having a bottom wall, a side wall and an open top end opposite said bottom wall;
a metallic ground strap having a bottom section coupled to said bottom wall by a first overmolded portion integrally formed with said bottom wall and surrounding a portion of said bottom section of said ground strap, a first leg extending from a first end of said bottom section and having an upper end coupled to a top edge of said side wall, and a second leg extending from a second end of said bottom section of said ground strap and having an upper end coupled to said top edge of said side wall opposite said first leg.

16. The electrical box assembly of claim 15, wherein said electrical box has a raised rib on said bottom wall for supporting said bottom section of said ground strap, said bottom section of said ground strap being spaced from said bottom wall, and where said first overmolded portion is integrally formed with said raised rib to fix said ground strap to said raised rib.

17. The electrical box assembly of claim 16, further comprising a second overmolded portion surrounding said ground strap at an apex between said first leg and bottom section of said ground strap, said second overmolded portion being integrally formed with said electrical box.

18. The electrical box assembly of claim 17, further comprising
a third overmolded portion surrounding said ground strap at an apex between said bottom section and second leg of said ground strap, said third overmolded portion being integrally formed with said electrical box.

19. The electrical box assembly of claim 18, further comprising
a first post formed on an inner face of said side wall for supporting said first leg, said first post having a top face, and where said upper end of said first leg has a mounting flange on a top face of said post and a downwardly extending tab, where said post is molded onto said tab to fix said ground strap to said electrical box.

20. The electrical box assembly of claim 19, further comprising
a second post formed on an inner face of said side wall for supporting said second leg, said second post having a top face and where said upper end of said second leg has a mounting flange on a top face of said second post and a downwardly extending tab, where said second post is molded onto said tab to fix said ground strap to said electrical box.

21. The electrical box assembly of claim 15, wherein
said first overmolded portion is integrally formed with said bottom wall and side wall of said electrical box and surrounds a portion of said first leg and said bottom section of said ground strap.

22. The electrical box assembly of claim 15, wherein
said bottom section of said ground strap has a center aperture, and where said first overmolded portion penetrates said center aperture to anchor said bottom section of said ground strap to said bottom wall of said electrical box.

23. A process of producing a non-metallic plastic electrical box having a metallic ground strap where the electrical box is molded around at least one portion of the metallic ground strap to capture the ground strap, said process comprising:
positioning the metallic ground strap in a mold cavity, said metallic ground strap having a bottom section, a first leg extending perpendicular from a first end of the bottom section, a second leg extending substantially perpendicular from a second end of said bottom section, each of the first and second legs having an upper end;
molding the electrical box onto the metallic ground strap from a molding material where said electrical box has a molded first overmolded portion surrounding a portion of the metallic ground strap to fix the metallic ground strap to the electrical box and allow expansion and contraction of the metallic ground strap and the electrical box without buckling or deformation of the metallic ground strap during molding and cooling of the electrical box, said electrical box being a one-piece, unitary structure with a bottom wall, a side wall and an open top end with the metallic ground strap fixed to an inner surface of the electrical box.

24. The process of claim 23, wherein
said mold cavity is formed by a first mold part having an outer end face for forming a bottom surface of the electrical box and opposite outer side faces, each of said end face and opposite side faces having a groove receiving said metallic ground strap; and
a second mold part mating with said first mold part to form said mold cavity therebetween, said process comprising the step of introducing said molding material into said mold cavity.

25. The process of claim 24, wherein
said first mold part has a recess formed in the groove of said outer end face for molding the overmolded portion around the bottom section of the metallic ground strap and where the first overloaded portion is integrally formed with the electrical box.

26. The process of claim 25, wherein
said mold cavity has a recessed portion to form a second overmolded portion around the metallic ground strap at an apex between the first end of the bottom section and the first leg, and a third overmolded portion around an apex between the second end of the bottom section and the second leg to fix the metallic ground strap to the electrical box, said process including the step of forming said second and third overmolded portion around said ground strap.

27. The process of claim 23, further comprising
molding a first post and a second post on an inner face of said side wall of said electrical box capturing said upper end of said first and second legs, said upper end having a mounting flange overlying a top edge of said post and having a threaded screw hole for receiving a mounting screw of an electrical wiring device.

28. An electrical box assembly produced according to the process of claim 23, wherein
said ground strap is fixed to said bottom wall of said electrical box by said first overmolded portion.

29. A process of producing a non-metallic electrical box having a bottom wall, a side wall, and an open end opposite said bottom wall and a metallic ground strap comprising the steps of:
providing a first mold part for molding an interior of the electrical box, said first mold part having a bottom face and opposite side faces, said bottom face having a recess extending along the bottom face and opposite side faces;
positioning a metallic ground strap in said recess, said ground strap having a bottom section received in the recess along the bottom face of the first mold part and first and second legs received in said recess along the respective opposite side faces, said metallic ground strap further having an upper end of each of said first and second legs;
coupling a second mold part to said first mold part to define a mold cavity therebetween; and
injecting a plastic material into said mold cavity between said first mold part and said second mold part and molding the electrical box as a one-piece, unitary structure to said metallic ground strap, said first and second mold parts forming a molded first overmolded portion overlying a portion of said bottom section of said metallic ground strap to allow expansion and contraction of said metallic ground strap and electrical box without distortion of said electrical box.

30. The process of claim 29, wherein
said first and second mold parts define a cavity recessed portion for molding said first overmolded portion around said bottom section of said ground strap, a recessed portion for molding a second overmolded portion around said ground strap at an apex between said bottom second and said first leg, and a recessed portion for molding a third overmolded portion around said ground strap at an apex between said bottom section and second leg.

* * * * *